US010982715B2

United States Patent
Iizumi et al.

(10) Patent No.: US 10,982,715 B2
(45) Date of Patent: Apr. 20, 2021

(54) ROTARY TABLE DEVICE (71) Applicant: THK CO., LTD., Tokyo (JP)

(72) Inventors: Makoto Iizumi, Tokyo (JP); Takahiro Mochizuki, Tokyo (JP); Toshiyuki Mukaiyama, Tokyo (JP); Kentaro Nishimura, Tokyo (JP)

(73) Assignee: THK CO., LTD., Tokyo (JP)

( * ) Notice: Subject to any disclaimer, the term of this patent is extended or adjusted under 35 U.S.C. 154(b) by 4 days.

(21) Appl. No.: 15/778,887

(22) PCT Filed: Nov. 15, 2016

(86) PCT No.: PCT/JP2016/004883
§ 371 (c)(1),
(2) Date: May 24, 2018

(87) PCT Pub. No.: WO2017/094231
PCT Pub. Date: Jun. 8, 2017

(65) Prior Publication Data
US 2018/0355917 A1 Dec. 13, 2018

(30) Foreign Application Priority Data
Dec. 2, 2015 (JP) .............................. JP2015-235369

(51) Int. Cl.
*F16H 1/12* (2006.01)
*F16C 33/58* (2006.01)
(Continued)

(52) U.S. Cl.
CPC .......... *F16C 33/581* (2013.01); *F16C 19/362* (2013.01); *F16C 19/466* (2013.01);
(Continued)

(58) Field of Classification Search
CPC .... F16C 33/581; F16C 19/362; F16C 19/466; F16C 33/7803; F16C 33/723
See application file for complete search history.

(56) References Cited

U.S. PATENT DOCUMENTS 6,408,707 B1 * 6/2002 Kimura ................ B62D 5/0409
74/388 PS
9,810,247 B2 * 11/2017 Tabuchi ................ F15B 15/065
(Continued)

FOREIGN PATENT DOCUMENTS

DE 60105247 T2 9/2005
JP 57-145822 U 9/1982
(Continued)

OTHER PUBLICATIONS

International Search Report dated Feb. 21, 2017, issued in counterpart application No. PCT/JP2016/004883. (2 pages).
(Continued)

*Primary Examiner* — Zakaria Elahmadi
(74) *Attorney, Agent, or Firm* — Westerman, Hattori, Daniels & Adrian, LLP (57) ABSTRACT

The rotary table device includes a base, a motor, a rotary drive shaft and a cross-roller bearing. An outer ring is rotationally driven through engagement of a pinion gear formed at a shaft end of the rotary rive shaft with a rack gear formed on the outer ring and transmission of a rotary drive force from the rotary drive shaft to the outer ring. The outer ring is formed in a hollow cylindrical shape covering a side of an inner ring, includes a table capable of mounting an external member on one side of the hollow cylindrical shape, and is integrated with the rack gear formed over an entire circumference of the other side thereof. With such a configuration, a rotary table device that can realize reduction in height, size and weight can be provided.

4 Claims, 9 Drawing Sheets

(51) Int. Cl.
- *F16C 33/78* (2006.01)
- *F16C 19/36* (2006.01)
- *F16C 19/46* (2006.01)
- F16C 19/18 (2006.01)
- F16C 33/60 (2006.01)
- F16C 33/72 (2006.01)

(52) U.S. Cl.
CPC ........ *F16C 33/586* (2013.01); *F16C 33/7803* (2013.01); *F16C 33/7889* (2013.01); *F16H 1/12* (2013.01); *F16C 19/184* (2013.01); *F16C 33/60* (2013.01); *F16C 33/723* (2013.01); *F16C 2322/39* (2013.01)

(56) References Cited

U.S. PATENT DOCUMENTS

| | | | |
|---|---|---|---|
| 2002/0138959 A1 | 10/2002 | Kato | |
| 2010/0018387 A1* | 1/2010 | Miyazawa | F15B 15/065 92/136 |
| 2010/0269618 A1* | 10/2010 | Yamamoto | F16H 1/145 74/459.5 |
| 2011/0019953 A1* | 1/2011 | Nuissl | F16C 19/362 384/572 |
| 2012/0308169 A1* | 12/2012 | Kuo | F16C 19/362 384/447 |

FOREIGN PATENT DOCUMENTS

| | | | | |
|---|---|---|---|---|
| JP | 2002-354778 A | | 12/2002 | |
| JP | 2003-311565 A | | 11/2003 | |
| JP | 2003311565 A | * | 11/2003 | ............ F16C 19/362 |
| JP | 2004-162868 A | | 6/2004 | |
| JP | 2004162868 A | * | 6/2004 | |
| JP | 2009-174663 A | | 8/2009 | |

OTHER PUBLICATIONS

Notice of Allowance dated May 16, 2017, Issued in counterpart Japanese Patent Application No. 2015-235369, w/ English translation (7 pages).

Office Action dated Feb. 26, 2019, issued in counterpart DE application No. 112016005512.9, with English abstract. (10 pages).

\* cited by examiner

ROTARY TABLE DEVICE

TECHNICAL FIELD

The present invention relates to a rotary table device.

BACKGROUND ART

Conventionally, a rotary table device in which a table supported by a bearing is rotatable by a drive force from a motor as a drive source is known. For example, Patent Literature 1 described below discloses a rotary table device in which a rotary table is rotatably supported on a base via a bearing and rotated by a rotary drive force by a linear motor.

CITATION LIST

Patent Literature

Patent Literature 1: JP 2002-354778 A

DISCLOSURE OF THE INVENTION

Problems to be Solved by the Invention

However, the rotary table device in Patent Literature 1 described above has a motor disposed between the rotary table and the base, which increases a height of the device. In addition, the rotary table device in Patent Literature 1 described above requires a plurality of bearings to support a rotary shaft where the rotary table is fixedly installed, which increases parts in number and the device in size.

The present invention has been made in view of the problems described above, and an object thereof is to provide a rotary table device that can realize reduction in height, size and weight.

Means For Solving the Problems

A rotary table device according to the present invention includes: a base serving as an attachment reference; a motor as a drive source; a rotary drive shaft rotatable by a rotary drive force from the motor; and a cross-roller bearing including an annular inner ring fixedly installed on the base, an outer ring disposed on an outer peripheral side of the inner ring, and a plurality of rolling elements rollably disposed in a track space created between the inner ring and the outer ring in a circumferential direction, wherein the outer ring is rotationally driven through engagement of a pinion gear formed at a shaft end of the rotary drive shaft with a rack gear formed on the outer ring and transmission of a rotary drive force from the rotary drive shaft to the outer ring, and the outer ring is formed in a hollow cylindrical shape covering a side of the inner ring, includes a table capable of mounting an external member on one side of the hollow cylindrical shape, and is integrated with the rack gear formed over an entire circumference of the other side of the hollow cylindrical shape.

Effects of the Invention

According to the present invention, it is possible to provide a rotary table device that can realize reduction in height, size and weight.

BRIEF DESCRIPTION OF THE DRAWINGS

FIG. 6(a) is a top view and FIG. 6(b) is a longitudinal sectional view of a VI-VI section in FIG. 6(a).

MODE FOR CARRYING OUT THE INVENTION

A preferred embodiment for carrying out the present invention will be described below using the drawings. The following embodiment does not limit the invention claimed in each claim, and all combinations of features described in the embodiment are not necessarily essential to means for solving the problems of the invention.

Figure 1:
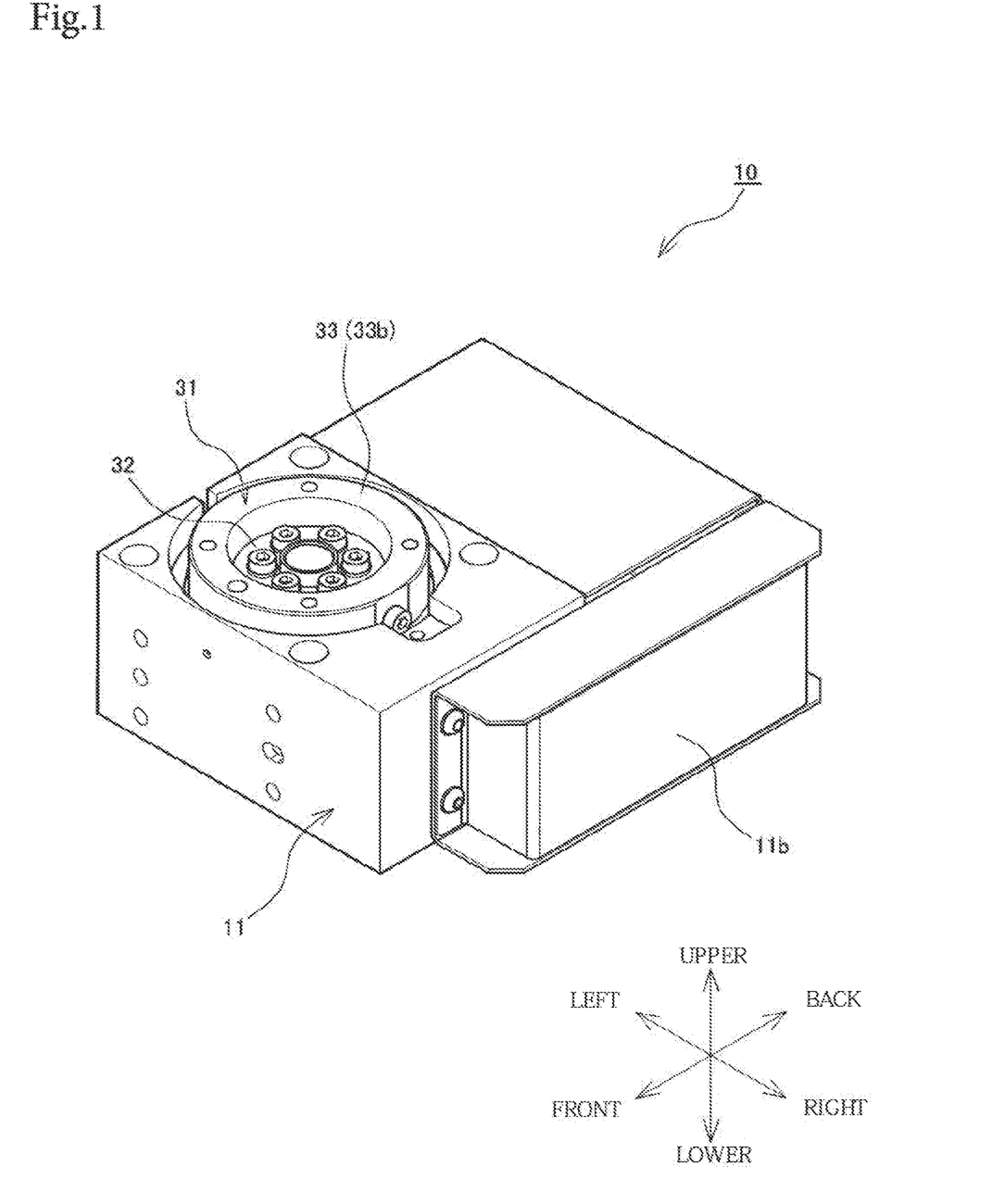
FIG. 1 is an external perspective view from a front upper side of a rotary table device according to the present embodiment.
Figure 2:
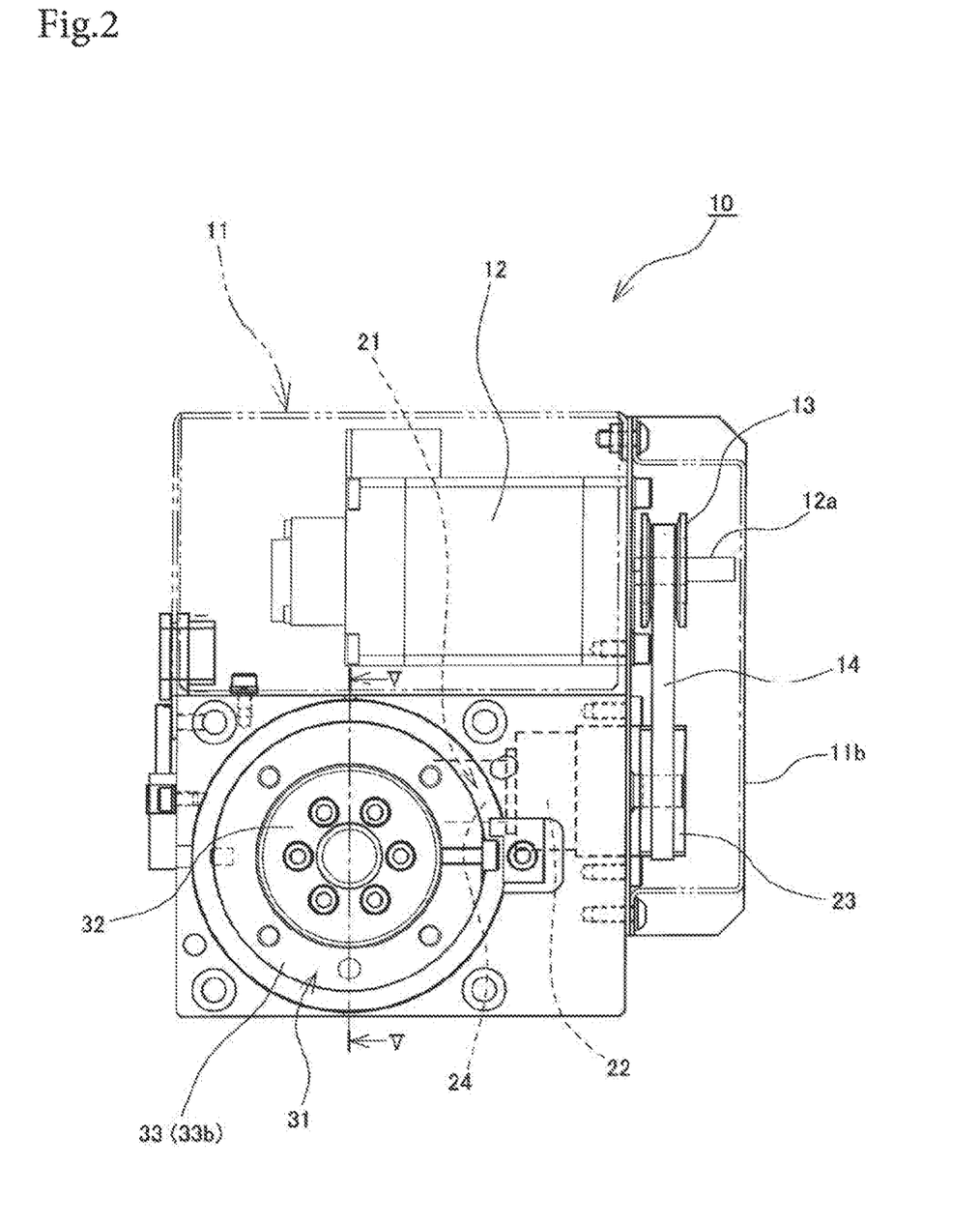
FIG. 2 is a partial perspective view from a top surface side of the rotary table device according to the present embodiment.
Figure 3:
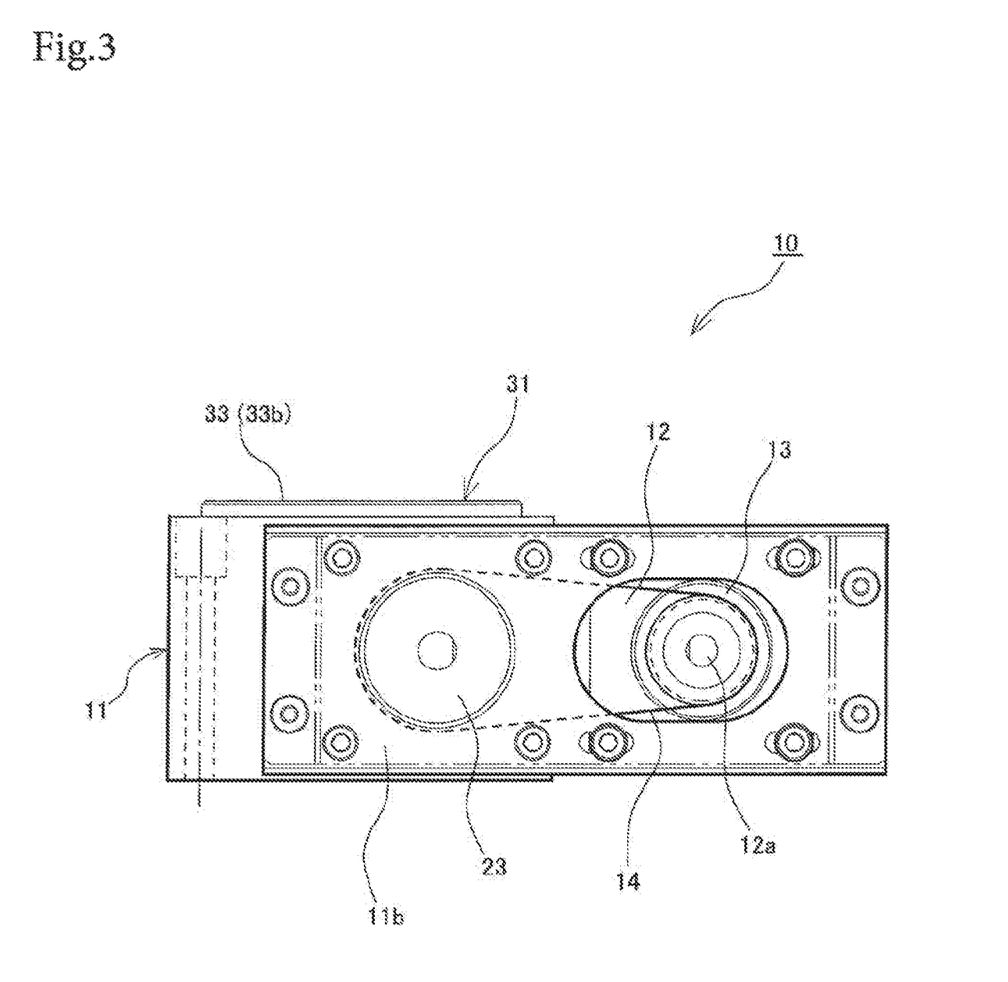
FIG. 3 is a partial perspective view from a right side of the rotary table device according to the present embodiment.
Figure 4:
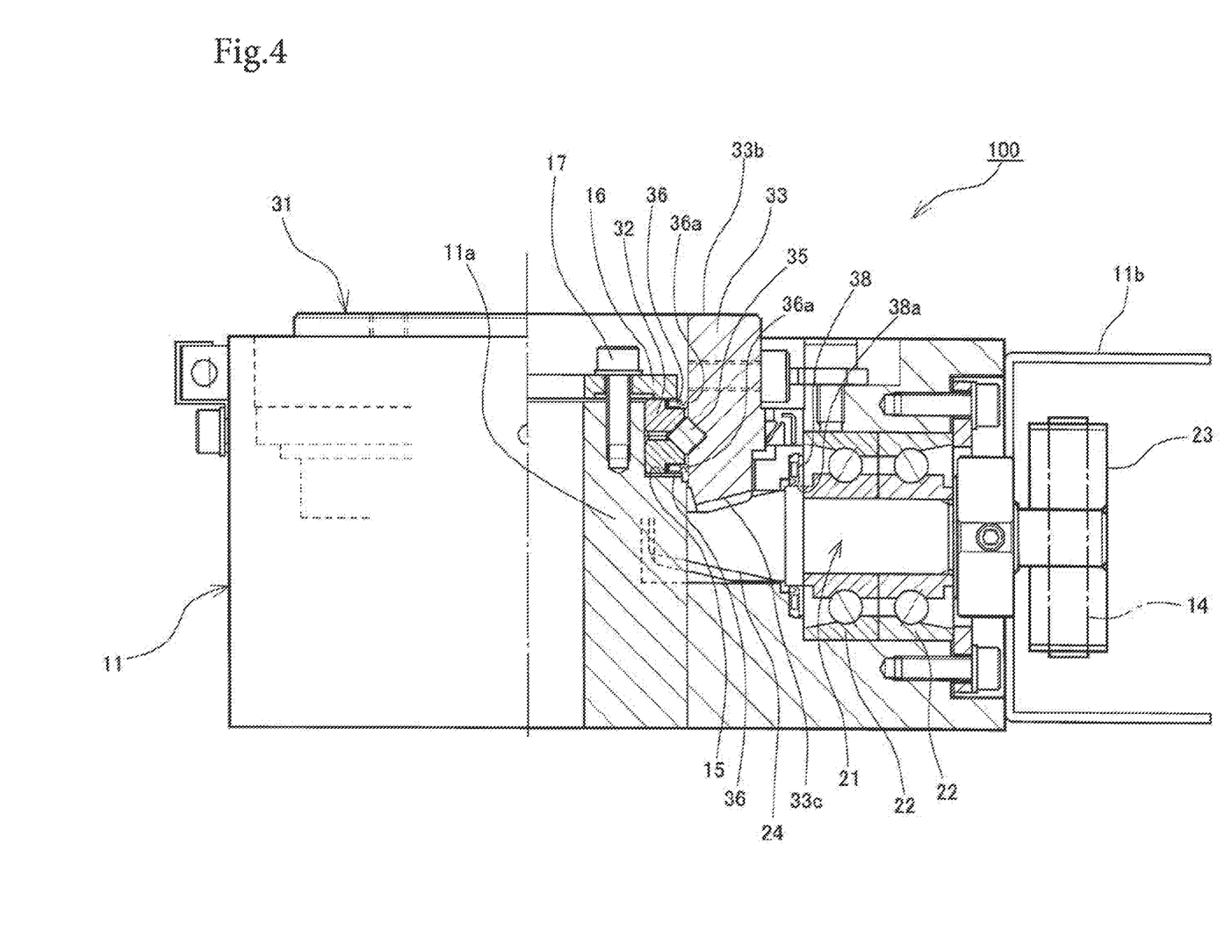
FIG. 4 is a partial perspective view from a front side of the rotary table device according to the present embodiment.
Figure 5:
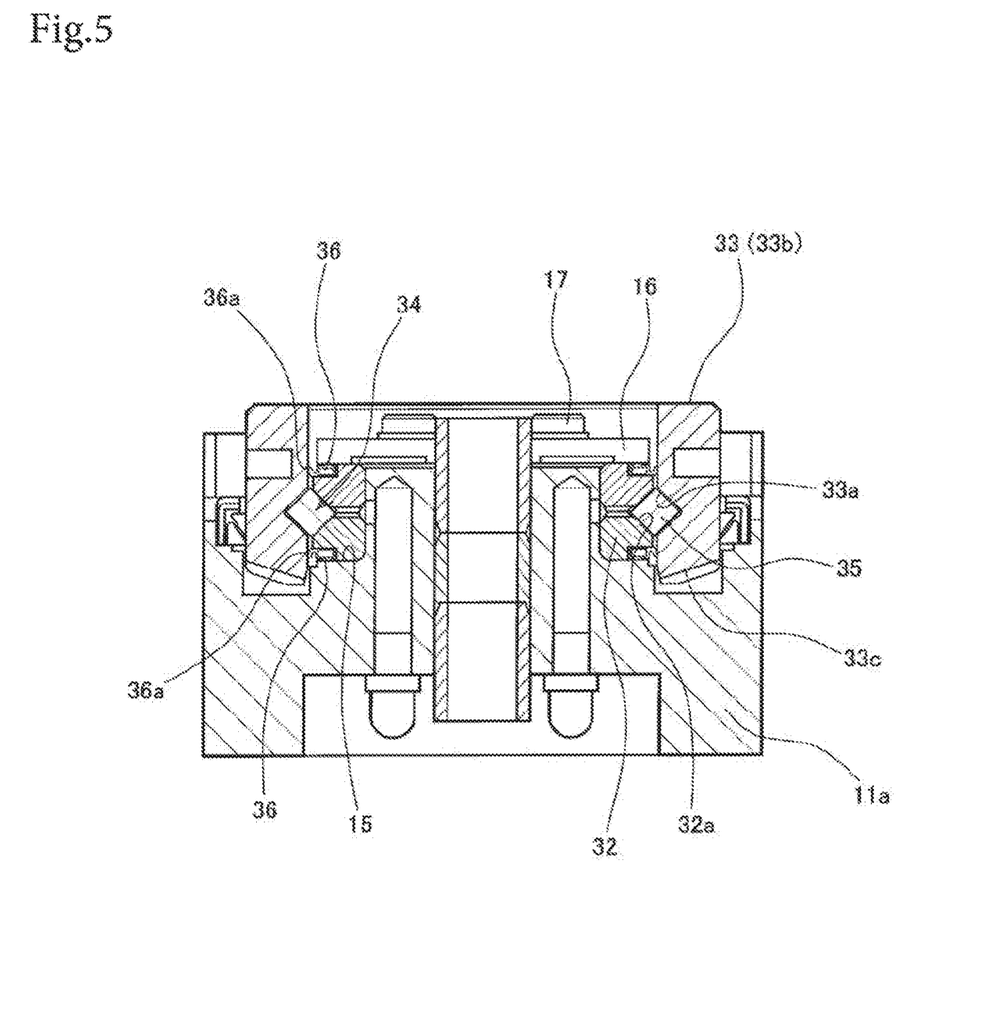
FIG. 5 is a longitudinal sectional right-side view of a V-V section in FIG. 2 according to an embodiment of the present invention.
Figure 6:
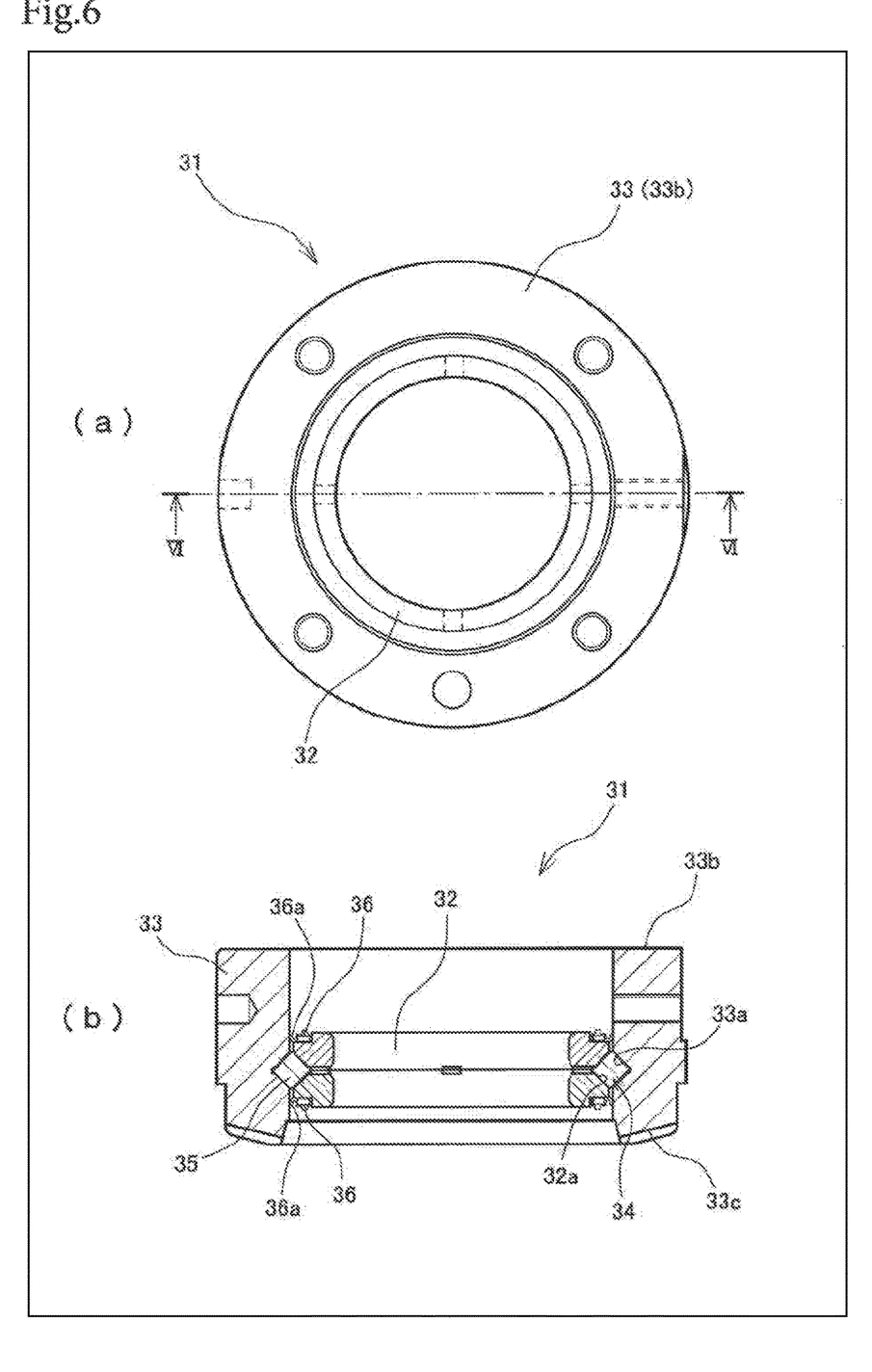
FIG. 6 illustrates a cross-roller bearing included in the rotary table device according to the present embodiment.

Firstly, with reference to FIGS. 1 to 6, a specific configuration of a rotary table device according to the present embodiment will be described. Here, FIG. 1 is an external perspective view from a front upper side of the rotary table device according to the present embodiment. FIG. 2 is a partial perspective view from a top surface side of the rotary table device according to the present embodiment, and FIG. 3 is a partial perspective view from a right side of the rotary table device according to the present embodiment. FIG. 4 is a partial perspective view from a front side of the rotary table device according to the present embodiment. FIG. 5 is a longitudinal sectional right-side view of a V-V section in FIG. 2. FIG. 6 illustrates a cross-roller bearing included in the rotary table device according to the present embodiment. FIG. 6(a) is a top view and FIG. 6(b) is a longitudinal sectional view of a VI-VI section in FIG. 6(a). In this specification, for convenience of description, a direction of a rotary table device 10 according to the present embodiment is defined by describing a direction of "front/back, upper/lower or right/left" in FIG. 1. However, this direction does not limit using conditions of the rotary table device 10 according to the present embodiment.

The rotary table device 10 according to the present embodiment includes, as illustrated in FIGS. 1 to 3, a housing 11 in a substantially cubic outer shape. On a front side of the housing 11, a cross-roller bearing 31 is disposed, while on a rear side of the housing 11, a motor 12 as a drive source is disposed. The cross-roller bearing 31 and the motor 12 are disposed side by side in a front/back direction.

The motor 12 is housed within the housing 11 and disposed to project a motor drive shaft 12a rightward from a right side of the housing 11. At a shaft end of the motor drive shaft 12a, a pulley 13 is installed. A belt 14 can be wound around this pulley 13.

On a front side of the motor 12 and between the motor 12 and the cross-roller bearing 31, a rotary drive shaft 21 rotatable by a rotary drive force from the motor 12 is installed (see FIGS. 2 and 4). The rotary drive shaft 21 is a shaft-shaped member with an axis direction thereof disposed in parallel to one of the motor drive shaft 12a included in the motor 12. At a shaft end on a right side of the rotary drive shaft 21, a pulley 23 is installed, around which the belt 14 can be wound as well. In brief, between the pulley 13 installed at the shaft end of the motor drive shaft 12a and the pulley 23 installed at the shaft end on the right side of the rotary drive shaft 21, the belt 14 in an annular shape is placed with predetermined tension. Therefore, when the motor 12 is driven, a rotary drive force generated by the motor 12 is transmitted to the motor drive shaft 12a, the pulley 13, the belt 14 and the pulley 23 to rotate the rotary drive shaft 21. A cover 11b is installed on an outer periphery of the motor drive shaft 12a as a rotating body, the pulley 13, the belt 14 and the pulley 23, and safety measures and measures to maintain stable operation of the rotary table device 10 are taken by covering the motor drive shaft 12a as a rotating body, the pulley 13, the belt 14 and the pulley 23.

The rotary drive shaft 21 according to the present embodiment is, as illustrated in FIG. 4, supported rotatably by two angular ball bearings 22 installed in the housing 11. These two angular ball bearings 22 are installed such that contact angle directions thereof are different from each other. Therefore, even when a load in any direction is applied to the rotary drive shaft 21, loads in all directions can be supported simultaneously. Thus, in the present embodiment, the rotary drive shaft 21 can stably rotate within the housing 11.

At a shaft end on a left side of the rotary drive shaft 21 according to the present embodiment, that is, at a shaft end opposite to the side on which the pulley 23 is installed, a pinion gear 24 is formed. This pinion gear 24 is configured to be connected to an outer ring 33 of the cross-roller bearing 31 described later.

The cross-roller bearing 31 is a member installed on the base 11a serving as an attachment reference formed within the housing 11 (see FIG. 4). More specifically, the cross-roller bearing 31 according to the present embodiment includes an annular inner ring 32 fixedly installed on the base 11a, the outer ring 33 disposed on an outer peripheral side of the inner ring 32, and a plurality of rollers 35 as rolling elements rollably disposed in one row of track space 34 created between the inner ring 32 and the outer ring 33 in a circumferential direction.

A specific structure of the cross-roller bearing 31 according to the present embodiment will be specifically described with reference to FIG. 6. The cross-roller bearing 31 has the inner ring 32 including an inner track groove 32a with a substantially reversed L-shaped cross section on an outer peripheral surface thereof, the outer ring 33 including an outer track groove 33a with a substantially reversed L-shaped cross section on an inner peripheral surface thereof, and the rollers 35 as rolling elements rollably and crossly arranged in the track space 34 with a substantially rectangular shaped cross section, created between the inner track groove 32a and the outer track groove 33a. Such a structure allows the inner ring 32 and the outer ring 33 to relatively rotate in the circumferential direction.

The inner ring 32 is formed by a combination of annular halved members bisected vertically, and these two halved members are fastened and fixed by a fastening means such as an unillustrated bolt.

On the other hand, the outer ring 33 is formed in a hollow cylindrical shape covering a side on an outer peripheral side of the inner ring 32. In addition, the outer ring 33 includes a table 33b capable of mounting an external member in an area where the track space 34 is created, that is, on an upper side of the outer track groove 33a, and includes a rack gear 33c over the entire circumference of a bottom surface side of the hollow cylindrical shape. The rack gear 33c formed around the entire circumference of the bottom surface side of the outer ring 33 is configured to transmit, through engagement with the pinion gear 24 formed at the shaft end on the left side of the rotary drive shaft 21, a rotary drive force from the rotary drive shaft 21 to the outer ring 33. With such a configuration, the outer ring 33 is driven rotationally. The pinion gear 24 and the rack gear 33c according to the present embodiment have a hypoid gear structure and are engaged with each other while a rotation center axis of the rotary drive shaft 21 where the pinion gear 24 is formed is offset at a predetermined distance from a rotation center axis of the outer ring 33 where the rack gear 33c is formed (see FIGS. 2 and 4). With the hypoid gear structure, loads to gear teeth are dispersed due to engagement of a plurality of gear teeth, and thus a power transmission mechanism allowing for quiet operation even with high durability has been realized.

The cross-roller bearing 31 described above is installed by fixing the inner ring 32 to the base 11a serving as an attachment reference formed within the housing 11. In an area where the inner ring 32 is attached in the base 11a, a step-shaped shoulder 15 for fixedly installing the inner ring 32 is formed. This shoulder 15 is illustrated in detail in FIGS. 4 and 5. By fitting the inner ring 32 from an upper side to the step shape formed by the shoulder 15, a bottom surface side and an inner peripheral surface side of the inner ring 32 can be mounted in close contact with the shoulder 15. Procedures for fixing the cross-roller bearing 31 according to the present embodiment to the base 11a include firstly assembly of the cross-roller bearing 31 alone outside the housing 11, followed by fitting the cross-roller bearing 31 from the upper side of the base 11a to bring the bottom surface side and the inner peripheral surface side of the inner ring 32 into close contact with the shoulder 15. Subsequently, a retainer plate 16 is fixed with a bolt 17 to the top surface of the base 11a so as to retain the top surface side of the inner ring 32, which completes the fixing of the inner ring 32 to the base 11a.

The rotary table device 10 according to the present embodiment further includes a configuration for stable operation. More specifically, as illustrated in FIG. 4, two first sealing members 36 are disposed separately in an upper and a lower portion between the inner ring 32 and the outer ring 33 according to the present embodiment. Each of these first sealing members 36 is a member in an annular shape and fitted into a hollow shape formed on the top surface-side outer periphery and the bottom surface-side outer periphery of the inner ring 32. Additionally, the first sealing member 36 has, on the outer peripheral surface thereof, an outer lip 36a that comes into contact with the outer ring 33 when installed on the inner ring 32. These two first sealing members 36 are, when the inner ring 32 is fixedly installed on the base 11a, sandwiched between the shoulder 15 and the retainer plate 16. Therefore, even when the outer lip 36a rotates along with the inner ring 32 while being in contact with the outer ring 33, a stable and reliable fixed condition of the inner ring 32 is maintained. Thus, in the present embodiment, the first sealing member 36 is provided between the inner ring 32 and the outer ring 33. Therefore, lubricating oil, for example, present within the cross-roller bearing 31 does not leak out, and it is possible to suitably prevent foreign substances such as refuse from intruding inside the cross-roller bearing 31 from outside. Thus, a stable operating condition can be obtained over a long period of time.

Furthermore, in the rotary table device 10 according to the present embodiment, a second sealing member 38 in an annular shape is installed in an area where the rotary drive shaft 21 is disposed. This second sealing member 38 is a member having, on an inner peripheral surface of the annular shape, an inner lip 38a in contact with the rotary drive shaft 21, and is installed near two angular ball bearings 22 supporting the rotary drive shaft 21, that is, at an intermediate position between installation positions of the pinion gear 24 formed on the rotary drive shaft 21 and the two angular ball bearings 22. This second sealing member 38 is sandwiched between a structure inside the housing 11 and the angular ball bearings 22, and thus, a stable and reliable fixed condition is maintained. In addition, the inner lip 38a is constantly in contact with a surface of the rotary drive shaft 21 with a predetermined elastic force. Therefore, it is possible to suitably prevent, in particular, intrusion of foreign substances such as refuse and metallic powder from a side of the pinion gear 24 toward the angular ball bearings 22.

The specific configuration of the rotary table device 10 according to the present embodiment has been described above. The rotary table device 10 according to the present embodiment has, as described above, a configuration where the outer ring 33 included in the cross-roller bearing 31 simultaneously provides three functions of the rack gear 33c as a drive force transmission means, the cross-roller bearing 31 as a rotary table mechanism and the table 33b. Therefore, it is possible to obtain effects such as reduction in size and weight of the device. In the rotary table device 10 according to the present embodiment, the cross-roller bearing 31 is adopted as a rotary table mechanism. This cross-roller bearing 31 has roller rows orthogonally arranged such that load directions of the rollers 35 are alternately switched, which makes it possible to apply loads in all directions. In other words, adoption of the cross-roller bearing 31 in a rotary table mechanism makes it possible for one row of a roller 35 group rollably disposed in one row of track space 34 to be subjected to loads in all directions and obtain high rotation accuracy. It is also possible to reduce size in height of the rotary table device 10. Thus, through the cross-roller bearing 31 included in the rotary table device 10 according to the present embodiment, it is possible to obtain effects such as reduction in size and weight of the device.

Figure 7:
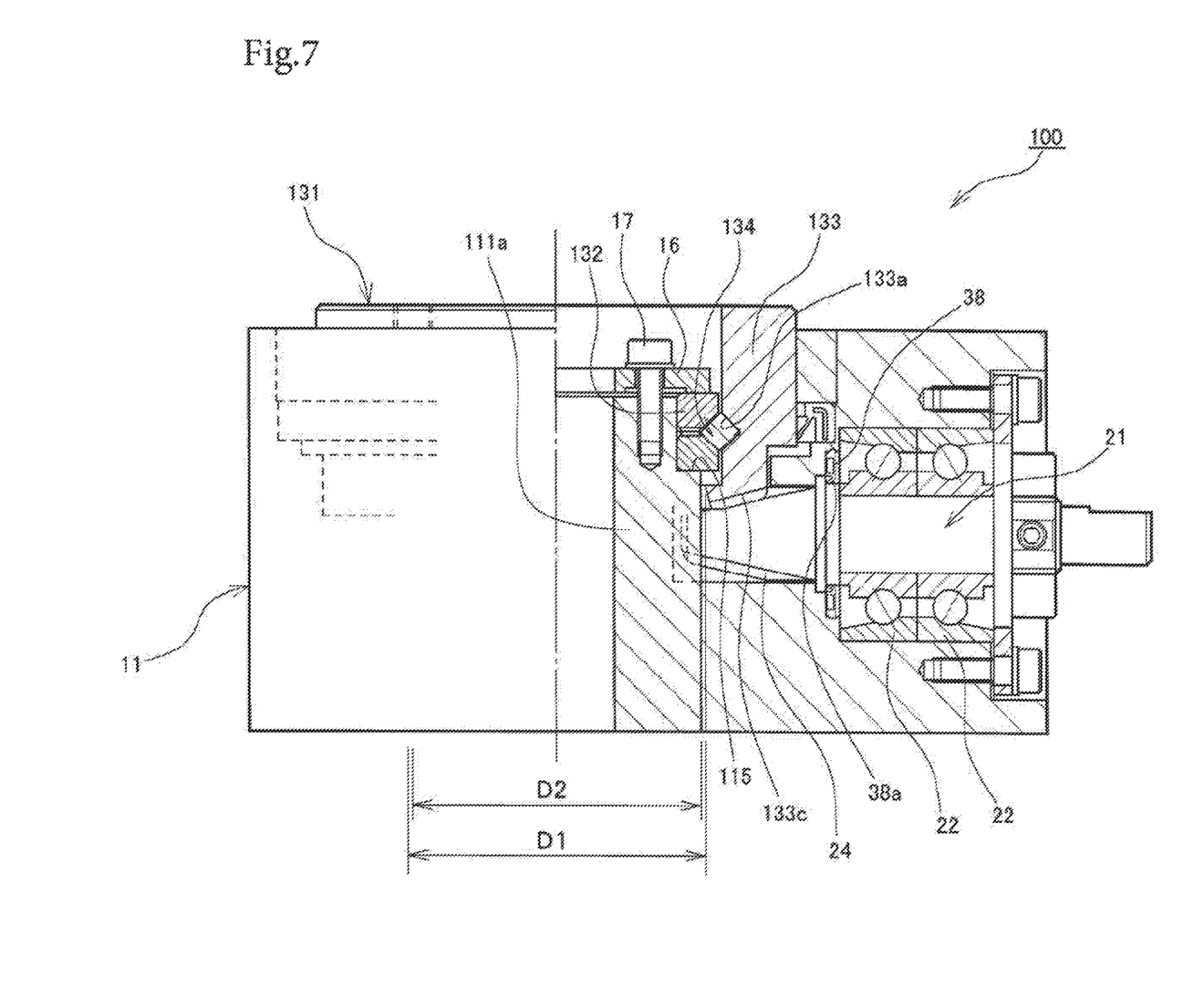
FIG. 7 illustrates an example of various possible modifications of a rotary table device according to an embodiment of the present invention.

A preferred embodiment of the present invention has been described above, but the technical scope of the present invention is not limited to the scope described in the above embodiment. Various types of changes or improvements can be added to the above embodiment. For example, in the rotary table device 10 according to the present embodiment described using FIGS. 1 to 6, the step shape of the shoulder 15 is deeply formed, and a part formed by the outer track groove 33a and the rack gear 33c of the outer ring 33 is in a skirt shape extending straight downward. However, shapes of these members such as a shoulder and an outer ring included in a rotary table device according to the present invention can be arbitrarily changed without impairing effects such as reduction in weight and size of the rotary table device. One example of such possible modifications of the present invention is illustrated in FIG. 7. Here, FIG. 7 illustrates an example of various possible modifications of a rotary table device according to the present invention. In descriptions of FIG. 7, configurations identical or similar to those in the embodiment described above bear identical signs, and the descriptions thereof will be omitted.

As illustrated in FIG. 7, in a rotary table device 100 according to a modification, a step shape of a shoulder 115 formed on a base 111a where an inner ring 132 is installed is shallowly formed, and the inner ring 132 is installed to stick out from a side wall surface of the base 111a. A part formed by an outer track groove 133a and a rack gear 133c in an outer ring 133 does not extend straight downward and has a substantially L-shaped cross section, and an inner peripheral surface of the outer ring 133 encompasses the inner ring 132 installed to stick out from the side wall surface of the base 111a. The rotary table device 100 according to the modification illustrated in FIG. 7 has the outer ring 133 disposed to close a lower side of a track space 134 of a cross-roller bearing 131. Therefore, it is possible, for example, to omit installation of the first sealing member 36 according to the embodiment described above to the inner ring 132 and obtain effects of reducing parts in number.

Regarding design conditions such as a step shape of a shoulder and internal diameters of an outer ring of a cross-roller bearing and a rack gear according to the present invention, there are design numerical limitations as described below. More specifically, as illustrated in FIG. 7, when an internal diameter of the rack gear 133c is D1, and a diameter of the shoulder 115 is D2, an inequality condition of $$D1 > D2 \quad \text{(Math 1)}$$

is essential.

Regarding the diameter D2 of the shoulder 115, based on a safety basis derived from applicant's empirical values, it is necessary to satisfy a mathematical condition of $$D2 = dp - 2 \times D \times \cos 45° \quad \text{(Math 2)}$$

where D is a roller diameter, and dp is a roller pitch circle diameter.

Then, it is necessary to design a rotary table device according to the present invention so as to satisfy an inequality of $$D1 > dp - 2 \times D \times \cos 45° \quad \text{(Math 3)}$$

derived by substituting (Math 2) into (Math 1).

Figure 8:
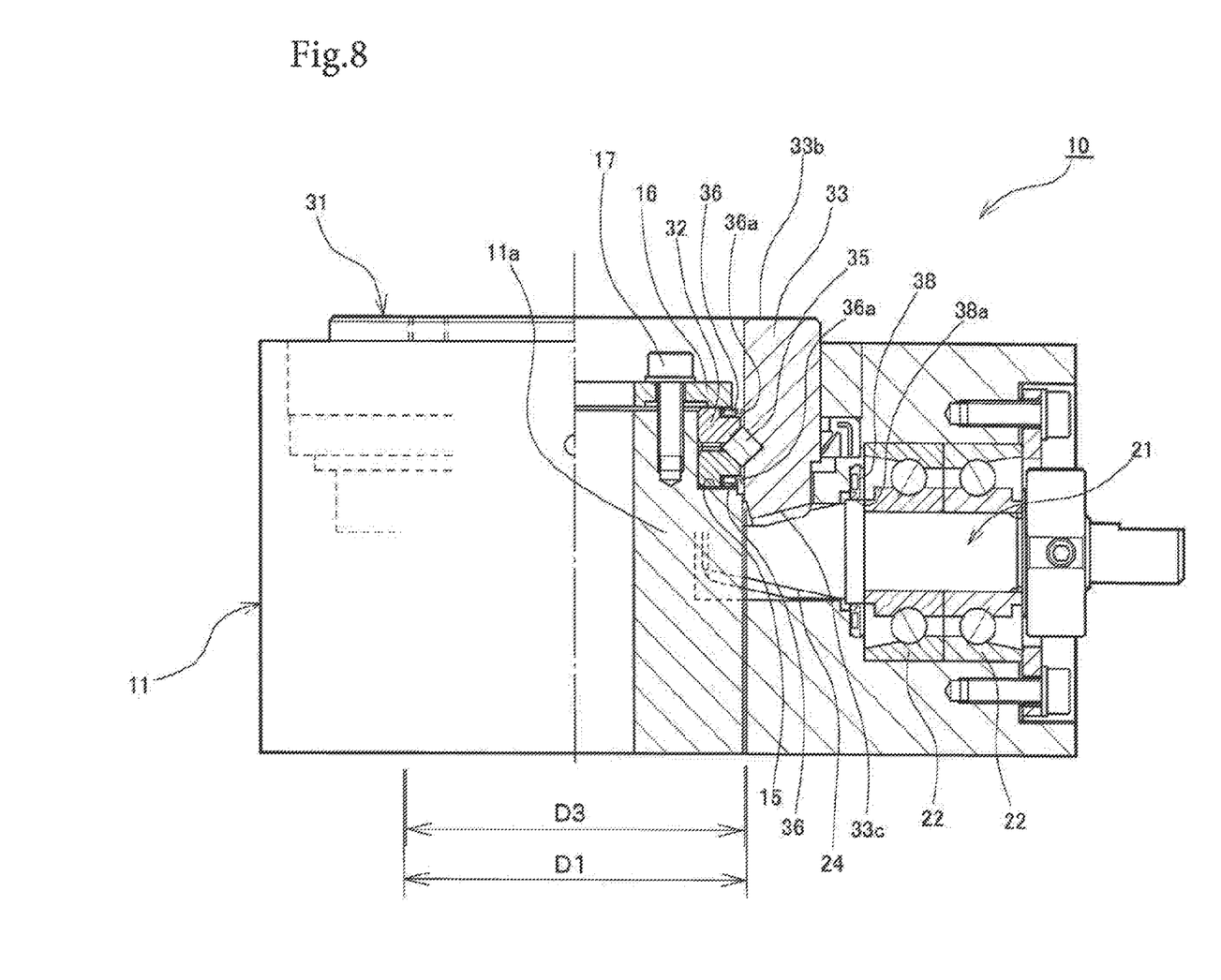
FIG. 8 is a partial perspective view from a front side of the rotary table device according to the present embodiment, corresponding to FIG. 4, and illustrates design conditions in manufacturing.

As described above, regarding design conditions such as a step shape of a shoulder and internal diameters of an outer ring of a cross-roller bearing and a rack gear according to the present invention, it is necessary to satisfy the inequality condition of (Math 3) described above, but there are also conditions from a manufacturing perspective. Thus, next, with reference to FIG. 8, design conditions in manufacturing a rotary table device according to the present invention will be described below. Here, FIG. 8 is a partial perspective view from a front side of the rotary table device 10 according to the present embodiment, corresponding to FIG. 4, and illustrates design conditions in manufacturing.

Numerical limitations in designing a rotary table device according to the present invention are as described using FIG. 7, but in actual designing including manufacturing constraints, the internal diameter D1 of the rack gear 33c and the internal diameter D3 of the outer ring 33 may be different. In other words, the rack gear 33c formed around the entire circumference of the bottom surface side of the outer ring 33 described in the above embodiment is not required to be formed around an entire bottom surface of the outer ring 33, and may be formed leaving a part of the entire circumference of the bottom surface side and the bottom surface of the outer ring 33 in the circumferential direction due to constraints on manufacturing techniques. Alternatively, only a part where the rack gear 33c is formed on the bottom surface side of the outer ring 33 may be formed with a diameter different from the internal diameter D3 of the outer ring 33. Thus, due to constraints on processing techniques of the outer ring 33, an inequality condition of $$D1 \geq D3 \quad \text{(Math 4)}$$

is essential.

As described above using FIGS. 7 and 8, in a rotary table device according to the present invention, it is necessary to satisfy the above conditions of (Math 3) and (Math 4). In other words, various types of modifications can be made, within a range satisfying these two inequality conditions, in a device configuration of a rotary table device according to the present invention.

Various possible examples of a rotary table device according to the present invention have been described above. However, the inventors have made a further improvement to a rotary table device according to the present invention. This improved configuration will be described below using FIG. 9. Here, FIG. 9 exemplifies an improved form of a rotary table device according to the present invention.

Figure 9:
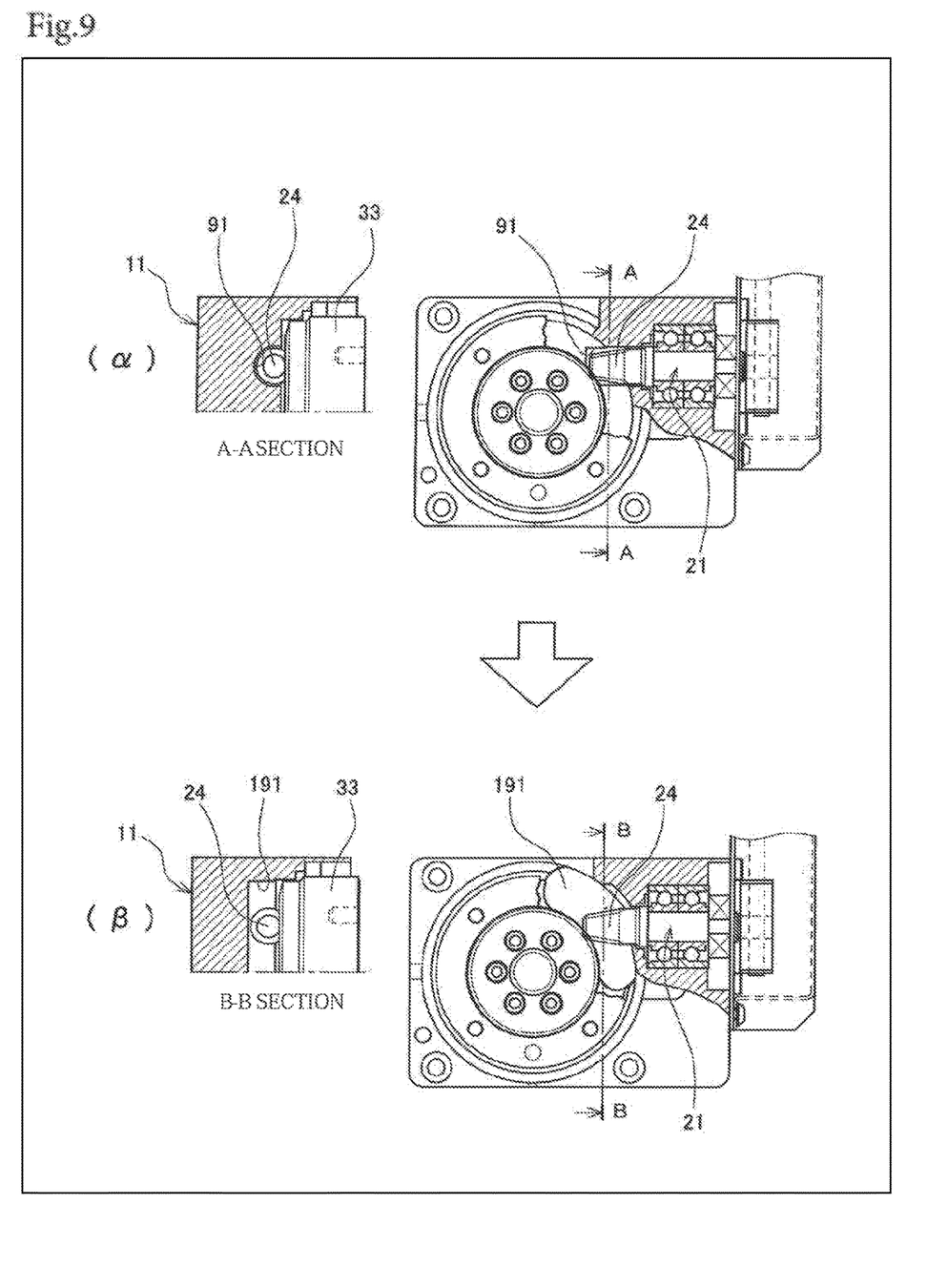
FIG. 9 exemplifies an improved form of a rotary table device according to an embodiment of the present invention.

In FIG. 9, FIG. 9(a) depicted at the top is a form adopted in the rotary table devices 10 and 100 according to the present embodiment and the modification described using FIGS. 1 to 8. In these examples, a counterbore space 91 machined and created in the bases 11a and 111a formed around the pinion gear 24 is created with a small gap along a periphery of the pinion gear 24. Specifically, the counterbore space 91 according to the present embodiment and the modification is created along an outer shape of the pinion gear 24. However, in a case of this sort of counterbore space 91, a tooth of the pinion gear 24 has a screw shape. Therefore, when this screw tooth is rotated at a high speed, action of a screw pump may cause grease inside the gear to leak out.

Thus, as illustrated in FIG. 9(β), the inventors have decided to create a large space around the pinion gear 24 by widening a counterbore space 191 machined and created in the bases 11a and 111a formed around the pinion gear 24. More specifically, the counterbore space 191 according to the improved form is created in a shape largely different from the outer shape of the pinion gear 24 and has a shape in which the space expands in a direction away from the outer shape of the pinion gear 24. The counterbore space 191 thus created as a large space functions as a space for releasing pressure exerted from the pinion gear 24 into the periphery of the pinion gear 24. In other words, the action of the screw pump can be reduced by widely counterboring the periphery of the pinion gear 24. Thus, according to the improved example illustrated in FIG. 9, it is possible to eliminate the problem that grease inside the gear leaks out.

REFERENCE NUMERALS 10, 100: rotary table device, 11: housing, 11a, 111a: base, 11b: cover, 12: motor, 12a: motor drive shaft, 13, 23: pulley, 14: belt, 15, 115: shoulder, 16: retainer plate, 17: bolt, 21: rotary drive shaft, 22: angular ball bearing, 24: pinion gear, 31, 131: cross-roller bearing, 32, 132: inner ring, 32a: inner track groove, 33, 133: outer ring, 33a, 133a: outer track groove, 33b: table, 33c, 133c: rack gear, 34, 134: track space, 35: roller, 36: first sealing member, 36a: outer lip, 38: second sealing member, 38a: inner lip, 91, 191: counterbore space

The invention claimed is:

1. A rotary table device comprising:
   a base serving as an attachment reference;
   a motor as a drive source;
   a rotary drive shaft rotatable by a rotary drive force from the motor;
   a cross-roller bearing including an annular inner ring fixedly installed on the base, an outer ring disposed on an outer peripheral side of the inner ring, and a plurality of rolling elements rollably disposed in a track space created between the inner ring and the outer ring in a circumferential direction; and
   a retainer plate fixedly holding the annular inner ring on the base, wherein
   the outer ring is rotationally driven, relative to the inner ring, through engagement of a pinion gear formed at a shaft end of the rotary drive shaft with a rack gear formed on the outer ring and transmission of a rotary drive force from the rotary drive shaft to the outer ring,
   the outer ring is formed in a hollow cylindrical shape covering a side of the inner ring, the outer ring including a table capable of mounting an external member on one side of the hollow cylindrical shape, the outer ring having a top surface that is higher than a top surface of the retainer plate, the hollow cylindrical shape of the outer ring having a hollow center extending from the one side to the other side of the hollow cylindrical shape, the hollow cylindrical shape of the outer ring being concentric with a hollow center of the retainer plate and a hollow center of the base, and the outer ring being integrated with the rack gear formed over an entire circumference of the other side of the hollow cylindrical shape, which other side is a bottom surface of the outer ring,
   the pinion gear and the rack gear having a hypoid gear structure and are engaged with each other while a rotation center axis of the rotary drive shaft where the pinion gear is formed is offset at a predetermined distance from a rotation center axis of the outer ring where the rack gear is formed, and
   an inequality condition of $$D1 \geq D3$$

is satisfied, when the internal diameter of the rack gear is D1, and an internal diameter of the outer ring is D3.

2. The rotary table device according to claim 1, wherein the base includes a shoulder in a step shape for fixedly installing the inner ring.

3. The rotary table device according to claim 2, wherein an inequality condition of $$D1 > D2$$

is satisfied, when an internal diameter of the rack gear is D1, and a diameter of the shoulder is D2.

4. The rotary table device according to claim 1 comprising:
   a first sealing member in an annular shape disposed between the inner ring and the outer ring; and
   a second sealing member in an annular shape disposed on the rotary drive shaft, wherein the first sealing member has an outer lip in contact with the outer ring and is installed on the inner ring, and the second sealing member has an inner lip in contact with the rotary drive shaft and is installed near a bearing supporting the rotary drive shaft.

* * * * *